US006803975B2

(12) United States Patent
Kim et al.

(10) Patent No.: US 6,803,975 B2
(45) Date of Patent: Oct. 12, 2004

(54) LIQUID CRYSTAL DISPLAY PANEL AND MANUFACTURING METHOD THEREOF

(75) Inventors: Woong-Kwon Kim, Kyonggi-do (KR); Seung-Ryul Park, Incheon (KR)

(73) Assignee: LG. Phillips LCD CO., Ltd., Seoul (KR)

( * ) Notice: Subject to any disclaimer, the term of this patent is extended or adjusted under 35 U.S.C. 154(b) by 84 days.

(21) Appl. No.: 10/201,789

(22) Filed: Jul. 25, 2002

(65) Prior Publication Data

US 2003/0020851 A1 Jan. 30, 2003

(30) Foreign Application Priority Data

Jul. 30, 2001 (KR) .......................................... 2001-45800

(51) Int. Cl.[7] .............................................. G02F 1/136
(52) U.S. Cl. ........................... 349/43; 349/42; 349/104; 349/106; 349/191
(58) Field of Search ....................... 349/43, 42

(56) References Cited

U.S. PATENT DOCUMENTS

2002/0109811 A1 * 8/2002 Park et al. .................. 349/113

* cited by examiner

Primary Examiner—Tarifur R. Chowdhury
Assistant Examiner—George Y. Wang
(74) Attorney, Agent, or Firm—McKenna Long & Aldridge LLP

(57) ABSTRACT

The present invention discloses an array substrate for use in a liquid crystal display device, which includes a transparent substrate that includes a display area and a non-display area. A plurality of red, green and blue color filters are formed on the transparent substrate in the display area. A first alignment key is formed on the transparent substrate in the non-display area and made of the same material as the color filters. An overcoat layer is formed on the plurality of red, green and blue color filters to cover the color filters in the display area. A passivation layer covers gate and data lines and a thin film transistor in the display area and covers the first alignment key in the non-display area, the passivation layer having a drain contact hole to the thin film transistor. A pixel electrode is formed on the passivation layer in the display area, the pixel electrode contacting the thin film transistor through the drain contact hole.

22 Claims, 14 Drawing Sheets

LIQUID CRYSTAL DISPLAY PANEL AND MANUFACTURING METHOD THEREOF

The present invention claims the benefit of Korean Patent Application No. 2001-45800, filed in Korea on Jul. 30, 2001, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate having color filters for use in the LCD device and a manufacturing method thereof.

2. Discussion of the Related Art

In general, since flat panel display devices are thin, low weight, and have low power consumption, they are increasingly being used for displays of portable devices. Among the various types of flat panel display devices, liquid crystal display (LCD) devices are widely used for laptop computers and desktop monitors because of their superiority in resolution, color image display, and display quality.

LCD devices use the optical anisotropy and polarization properties of liquid crystal molecules to produce a predetermined image. Liquid crystal molecules have a definite orientation that results from their peculiar characteristics. The specific orientation can be modified by an electric field that is applied across the liquid crystal molecules. In other words, electric fields applied across the liquid crystal molecules can change the orientation of the liquid crystal molecules. Due to optical anisotropy, incident light is refracted according to the orientation of the liquid crystal molecules.

Specifically, the LCD devices have upper and lower substrates with electrodes that are spaced apart and face each other, and a liquid crystal material is interposed therebetween. Accordingly, when a voltage is applied to the liquid crystal material by the electrodes of each substrate, an alignment direction of the liquid crystal molecules is changed in accordance with the applied voltage to display images. By controlling the applied voltage, the LCD device provides various transmittances for rays of light to display image data.

The lower substrate, commonly referred to as an array substrate, includes switching elements, such as thin film transistors (TFTs) and pixel electrodes. The thin films for the TFTs on the lower substrate are usually formed by repetitive photolithography. The upper substrate, commonly referred to as a color filter substrate, usually includes a common electrode and color filters. The color filters have red (R), green (G) and blue (B) sub-color filters that are alternately disposed on the upper substrate. The color filters are formed of organic substances and made by a method, such as pigment dispersion, dyeing process or electrostatic painting.

FIG. 1 is a schematic cross-sectional view showing a pixel of a related art liquid crystal display (LCD) panel. As shown in FIG. 1, the related art LCD panel includes a first substrate 11, a second substrate 21 and a liquid crystal layer 30. The upper and lower substrates 11 and 21 are spaced apart from each other, and the liquid crystal layer 30 is interposed therebetween. The upper and lower substrates 11 and 21 are often referred to as an array substrate and a color filter substrate, respectively.

A gate electrode 12 is disposed on a front surface of a first substrate 11, and a gate insulation layer 13 is formed to cover the gate electrode 12. The gate electrode 12 is made of a conductive material, such as metal, and the gate insulation layer 13 is made of a insulating material, such as silicon nitride ($SiN_x$) or silicon oxide ($SiO_2$). An active layer 14 that is made of amorphous silicon is disposed on the gate insulation layer 13, especially over the gate electrode 12. First and second ohmic contact layers 15a and 15b, which are made of doped amorphous silicon, are disposed on the active layer 14. Source and drain electrodes 16a and 16b are formed on the first and second ohmic contact layers 15a and 15b, respectively. The source and drain electrodes 16a and 16b are formed of a conductive material, such as metal. Thus, a thin film transistor (TFT) T on the first substrate 11 includes the gate electrode 12, the active layer 14, the ohmic contact layers 15a and 15b, and the source and drain electrodes 16a and 16b. Although not shown in FIG. 1, the gate electrode 12 is connected to a gate line (not shown), and the data electrode 14 is connected to a data line (not shown). The gate and data lines cross each other so as to define a pixel region. A passivation layer 17 is formed on the gate insulation layer 13 and on the source and drain electrodes 16a and 16b to cover the TFT T. An organic material, such as benzocyclobutene (BCB), or an inorganic material, such as silicon nitride or silicon oxide, is used for the passivation layer 17. The passivation layer 17 has a drain contact hole 17c therethrough to expose a portion of the drain electrode 16b. On the passivation layer 17, a pixel electrode 18 that is made of a transparent conductive material is formed such that the pixel electrode 18 contacts the drain electrode 16b through the drain contact hole 17c.

Meanwhile, as mentioned before, the second substrate 21 is spaced apart from the first substrate 11 over the TFT T. On the rear surface of the second substrate 21, a black matrix 22 is disposed in a position corresponding to the TFT T of the first substrate 11. Although it is not clearly shown in FIG. 1, the black matrix 22 is actually formed on the whole surface of the second substrate 21 and has an opening that corresponds to the pixel electrode 18 of the first substrate 11. The black matrix 22 prevents light leakage in the LCD panel except for a portion for the pixel electrode 18. The black matrix 22 protects the TFT T from the light such that the black matrix 22 prevents the occurrence of photo current in the TFT T. Color filters 23a and 23b are formed on the rear surface of the second substrate 21 to cover the black matrix 22. Each of the color filters 23a and 23b has one of the red, green and blue colors. The red, green and blue color filters are alternately arranged on the second substrate 21, and each of the red, green and blue color filters corresponds to one pixel region where the pixel electrode 18 is located. A common electrode 24 that is made of a transparent conductive material is disposed on the color filters 23a and 23b all over the second substrate 21. The liquid crystal layer 30 is interposed between the first and second substrates 11 and 21, specifically between the pixel electrode 18 and the common electrode 24.

In the conventional LCD panel mentioned above, the pixel electrode has a one-to-one correspondence with one of the color filters. Namely, after forming the array substrate and the color filter substrate, respectively, the color filter substrate having the color filters is arranged over the array substrate in order to let one pixel electrode correspond to one color filter. However, when arranging the second substrate to the first substrate or vice versa, misalignment can occur between the first substrate and the second substrate, thereby causing malfunction such as light leakage in the LCD panel. To overcome this problem, the black matrix on the second substrate is enlarged. However, in this case of enlarging the black matrix, the aperture ratio of the liquid crystal panel is lessened.

Therefore, the color filters are formed on the array substrate (i.e., the first substrate) to prevent misalignment between the first substrate and the second substrate, thereby reducing the black matrix size and increasing the aperture ratio of the LCD panel. When the color filters are formed between the substrate and the TFT (i.e., beneath the TFT), it is referred to as a Thin film transistor On Color filter (TOC) structure. At this time, only the black matrix and common electrode are formed on the second substrate without the color filters.

As mentioned hereinbefore, the array substrate includes many thin film transistors formed thereon and these thin film transistors are formed by the repetition of deposition and patterning. When patterning the layers and forming the thin film patterns accurately, a plurality of alignment keys should be formed previously at the peripheral portion of the substrate. Since the alignment keys have steps because of their thickness, the alignment keys can be recognized when patterning the opaque layers, such as metal layers. However, in the array substrate having the TOC structure, since the color filters and the overcoat layer on the color filter are relatively thick, the alignment keys are not recognized when patterning the opaque layers, such as metal layers. Therefore, the thin film patterns are not formed properly and misalignment occurs among the thin film patterns.

SUMMARY OF THE INVENTION

Accordingly, the present invention is directed to an array substrate for a liquid crystal display (LCD) device, that substantially obviates one or more of problems due to limitations and disadvantages of the related art.

An advantage of the present invention is to provide an array substrate for a liquid crystal display device, which has a high aperture ratio.

Another advantage of the present invention is to provide a method of manufacturing an array substrate for a liquid crystal display device, which promotes accurate alignment when forming thin films.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for use in a liquid crystal display device comprises a transparent substrate that includes a display area and a non-display area; a plurality of red, green and blue color filters that are formed on the transparent substrate in the display area; a first alignment key formed on the transparent substrate in the non-display area and made of the same material as said color filters; an overcoat layer formed on the plurality of red, green and blue color filters to cover said color filters in the display area; gate and data lines formed over the overcoat layer, the gate and data lines crossing each other to define a pixel region in the display area; a thin film transistor formed over the overcoat layer in the display area, the thin film transistor arranged in the pixel region and connected to the gate and data lines; a passivation layer covering the gate and data lines and the thin film transistor in the display area and covering the first alignment key in the non-display area, the passivation layer having a drain contact hole to the thin film transistor; a gate insulation layer interposed between the overcoat layer and the passivation layer in the display area and between the substrate and the passivation layer in the non-display area; and a pixel electrode formed on the passivation layer in the display area, the pixel electrode contacting the thin film transistor through the drain contact hole.

The array substrate for use in the liquid crystal display device further includes a buffer layer between the overcoat layer and the thin film transistor, and a black matrix on the transparent substrate in boundaries of the plurality of red, green and blue color filters. The black matrix is arranged between the transparent substrate and the color filters. The array substrate further includes a second alignment key between the transparent substrate and the first alignment key, wherein the second alignment key is made of the same material as the black matrix. The overcoat layer can cover the first alignment key in the non-display area.

In another aspect, a method of forming an array substrate for use in a liquid crystal display device includes providing a transparent substrate that includes a display area and a non-display area; forming a plurality of red, green and blue color filters on the transparent substrate in the display area; forming a first alignment key on the transparent substrate in the non-display area using the same material as said color filters; forming an overcoat layer on the plurality of red, green and blue color filters to cover said color filters in the display area; forming gate and data lines over the overcoat layer, the gate and data lines crossing each other to define a pixel region in the display area; forming a thin film transistor over the overcoat layer in the display area, the thin film transistor arranged in the pixel region and connected to the gate and data lines; forming a passivation layer to cover the gate and data lines and the thin film transistor in the display area and to cover the first alignment key in the non-display area, the passivation layer having a drain contact hole to the thin film transistor; forming a gate insulation layer between the overcoat layer and the passivation layer in the display area and between the substrate and the passivation layer in the non-display area; and forming a pixel electrode on the passivation layer in the display area, the pixel electrode contacting the thin film transistor through the drain contact hole.

The method further includes forming a black matrix on the transparent substrate in boundaries of the plurality of red, green and blue color filters, wherein the black matrix is arranged between the transparent substrate and the color filters. The method further includes forming a second alignment key between the transparent substrate and the first alignment key, wherein the second alignment key is made of the same material as the black matrix. The overcoat layer can cover the first alignment key in the non-display area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 1:
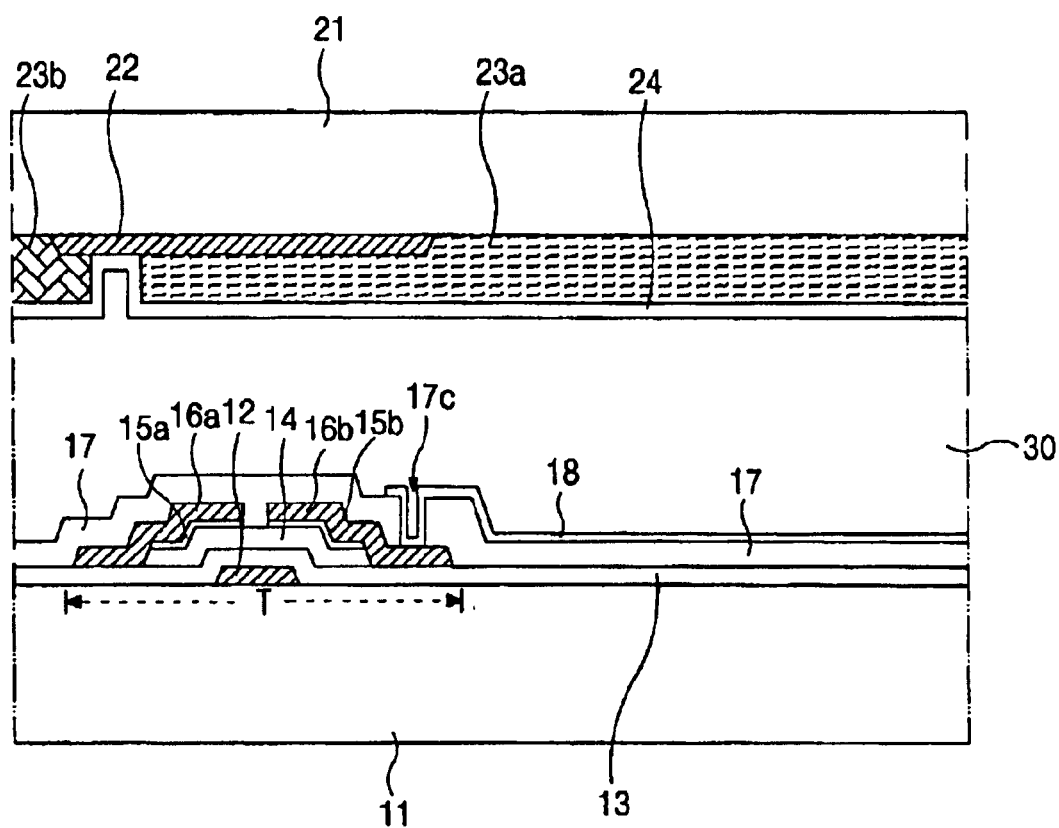
FIG. 1 is a schematic cross-sectional view showing a pixel of a related art liquid crystal display (LCD) panel.
Figure 2:
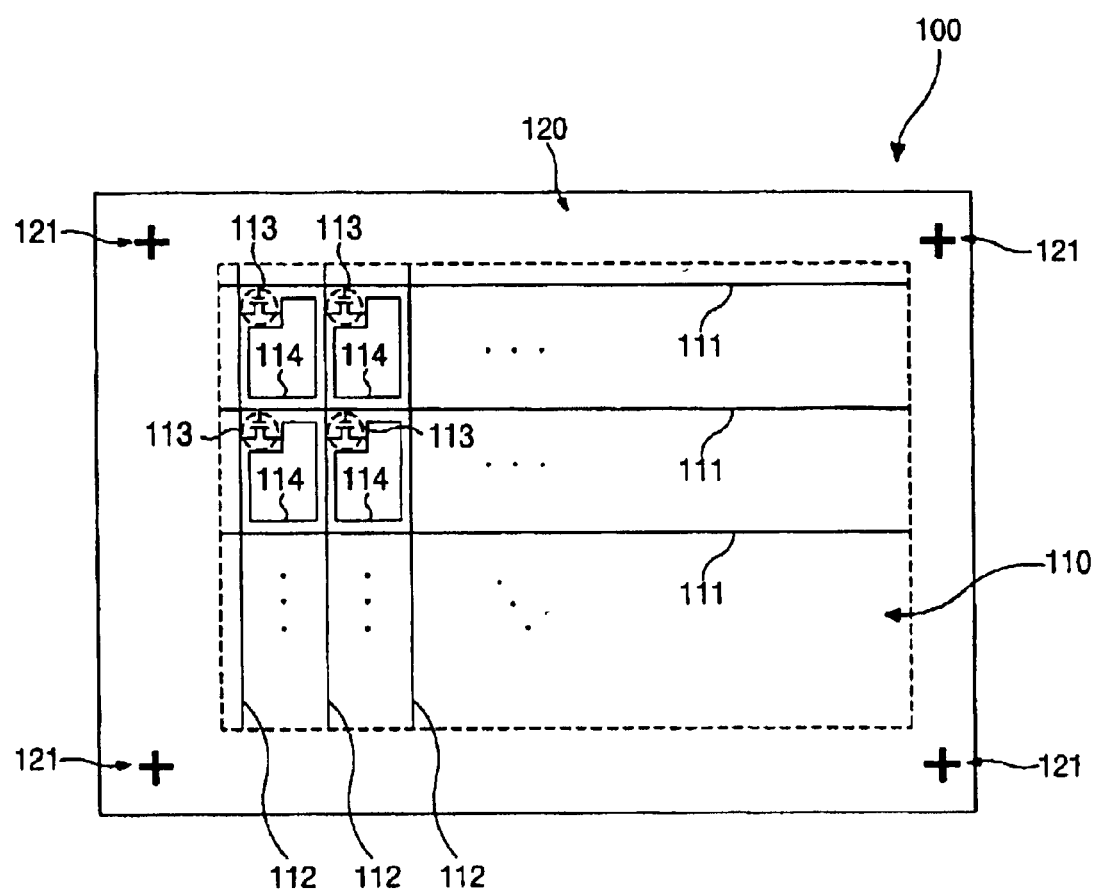
FIG. 2 is a schematic plan view showing an array substrate according to the present invention.

FIG. 2 is a schematic plan view showing an array substrate according to the present invention. As shown in FIG. 2, an array substrate 100 is divided into a display area 110 where the images are shown and a non-display area 120 around the display area 110.

In the display area 110, a plurality of gate lines 111 are arranged in a transverse direction and a plurality of data lines 112 are arranged in a longitudinal direction. The plurality of gate lines 111 cross the plurality of data lines 112, so the pair of the gate and data lines 111 and 112 defines a pixel region. At the corner of each pixel region where the data line 112 crosses the gate line 111, a thin film transistor (TFT) 113 is disposed as a switching device. A plurality of pixel electrodes 114 are formed in the pixel regions, and each of the pixel electrodes 114 is connected to each of the TFTs 113. Although not shown in FIG. 2, a plurality of color filters having red (R), green (G) and blue (B) colors are disposed at the pixel regions. Each R, G or B color filter corresponds to each pixel region. Specifically, the R, G and B color filters are beneath the TFTs 113 and pixel electrodes 114.

In the non-display area 120, gate drive circuit (not shown) and data drive circuit (not shown) are located in order to apply signals to the gate lines 111 and to the data lines 112, respectively. A plurality of alignment keys 121 are also located in the non-display area 120. The plurality of alignment keys 121 serve to accurately form and align the thin film patterns during the fabrication. The plurality of alignment keys 121 are positioned in the peripheral portions of the array substrate 110, for example, at the four corners. Although FIG. 2 shows the four alignment keys at the corners of the substrate, there is no limitation in positioning the alignment keys 121 even if they are located in the non-display area 120. Additionally, the number of alignment keys is not limited, but should be more than or equal to two. The alignment key 121 has a crisscross pattern in FIG. 2, but it can have a circular, rectangular or triangular pattern. There is no limitation in the shape of the alignment key 121.

Figure 3:
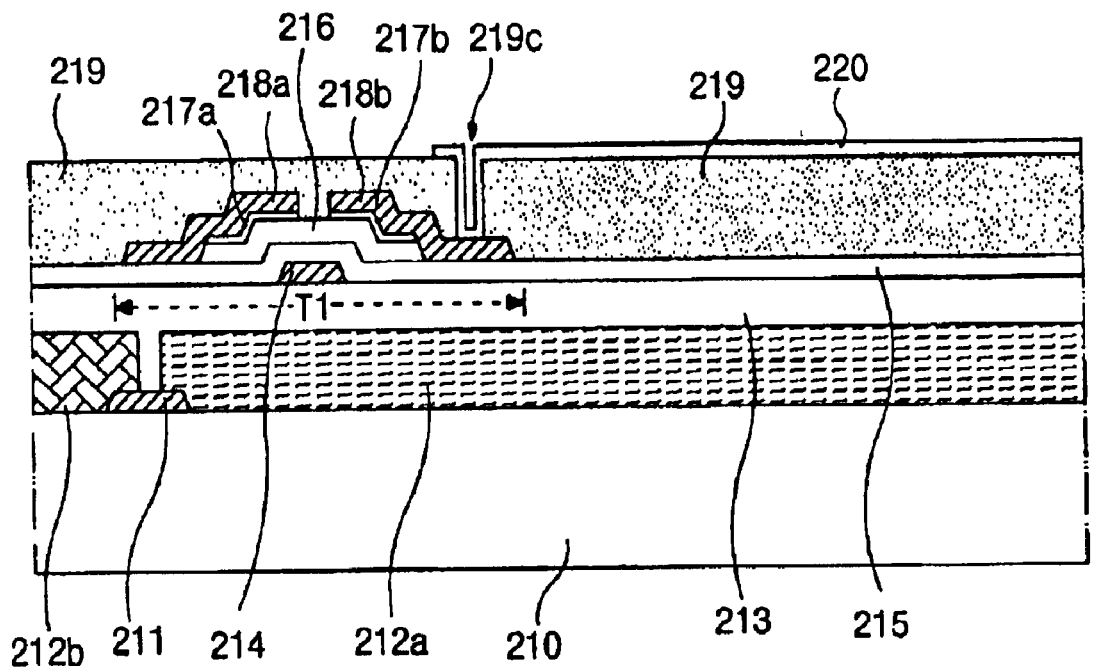
FIGS. 3 and 4 are cross-sectional views illustrating an array substrate according to a first embodiment of the present invention.
Figure 4:
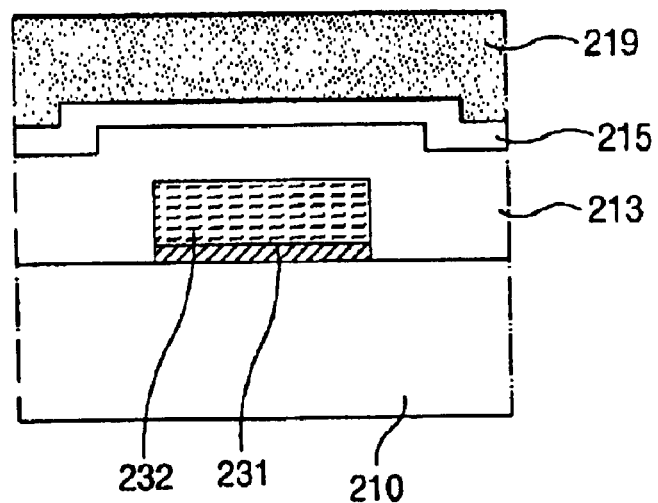

FIGS. 3 and 4 are cross-sectional views showing portions of the array substrate according to a first embodiment of the present invention. FIG. 3 is a cross-sectional illustration of the pixel region of the array substrate, and FIG. 4 is a cross-sectional illustration of the alignment key region of the array substrate.

Referring to FIG. 3, a black matrix 211 is disposed on a transparent substrate 210, and color filters 212a and 212b are also formed on the front surface of a transparent substrate 210 to cover the black matrix 211. Since the R, G and B colors filters are alternately arranged on the substrate, the adjacent color filters 212a and 212b of FIG. 3 do not have the same color. On the color filters 212a and 212b, an overcoat layer 213 is formed to protect the color filters 212a and 212b.

A gate electrode 214 is disposed on the overcoat layer 213, and then a gate insulation layer 215 is formed on the overcoat layer 213 to cover the gate electrode 214. Although not shown in FIG. 3, the gate electrode 214 is connected to the gate line (see reference 111 of FIG. 2), which applies a scanning signal. An active layer 216 is disposed on the gate insulation layer 215, especially over the gate electrode 214, and ohmic contact layers 217a and 217b are then disposed on the active layer 216. The active layer 216 is made of amorphous silicon, while the ohmic contact layers are made of impurity-doped amorphous silicon. Source and drain electrodes 218a and 218b, which are made of a metallic material, are disposed on the ohmic contact layer 217a and 217b, respectively. The source and drain electrodes 218a and 218b are spaced apart from and face each other across the gate electrode 214. Additionally, the source and drain electrodes 218a and 218b constitute a thin film transistor (TFT) T1 with the gate electrode 214 and active layer 216. The source electrode 218a is connected to the data line (see reference 112 of FIG. 2) that applies an image signal to the source electrode 218a.

On the gate insulation layer 215, a passivation layer 219 is formed to cover and protect the TFT T1. The passivation layer 219 has a drain contact hole 219c therethrough to expose a portion of the drain electrode 218b. A pixel electrode 220 that is made of a transparent conductive material is disposed on the passivation layer 219 such that the pixel electrode 220 contacts the drain electrode 218b through the drain contact hole 219c.

Referring to FIG. 4, the alignment key region of the array substrate is shown including a first alignment key 231 disposed on the transparent substrate 210, and a second alignment key 232 disposed on the first alignment key 231. The first alignment key 231 is made of the same material as the black matrix 211 of FIG. 3, and the second alignment key 232 is made of the same material as the color filter 212a or 212b. The first and second alignment keys 231 and 232 are covered by the overcoat layer 213. On the overcoat layer 213, the gate insulation layer 215 and the passivation layer 219 are sequentially formed.

In the array substrate having the thin film transistor on color filter (TOC) structure according to the first embodiment of the present invention, the alignment keys 231 and 232 are formed of the same materials as the black matrix 231 and color filter 212a or 212b, respectively. Therefore, the alignment keys 231 and 232 have a large step due to the large thickness of the alignment keys 231 and 232. Because of the large step, the alignment keys 231 and 232 are recognized more clearly when patterning the opaque layers, such as metal layers, although the overcoat layer 213 covers the alignment keys 231 and 232. Accordingly, the misalignment of the thin film patterns does not occur when patterning the layers and when forming the TFT.

FIGS. 5A to 5F show the process steps of manufacturing the array substrate of FIG. 3, and FIGS. 6A to 6F show the process steps of manufacturing the array substrate of FIG. 4.

Figure 5A:
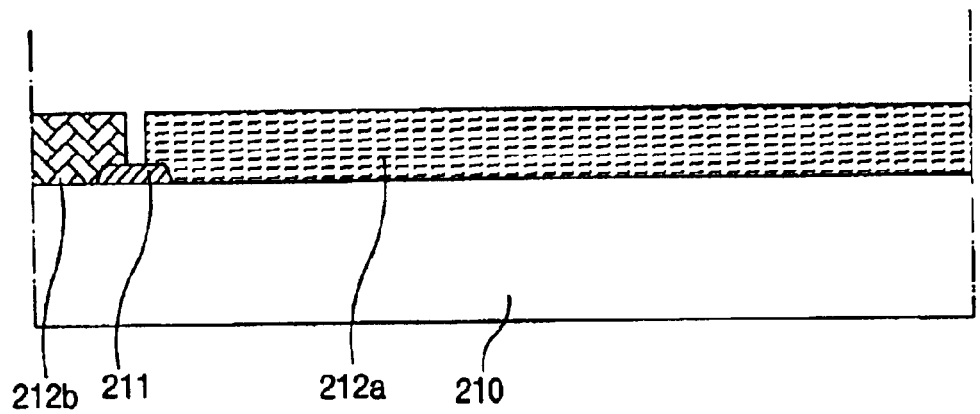
FIGS. 5A to 5F show the process steps of manufacturing the array substrate of FIG. 3.
Figure 6A:
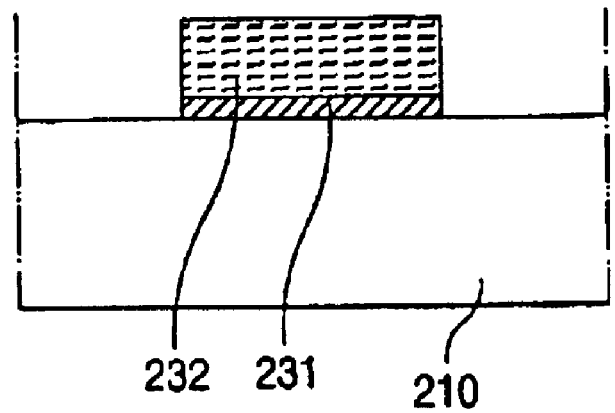
FIGS. 6A to 6F show the process steps of manufacturing the array substrate of FIG. 4.

Referring to FIGS. 5A and 6A, the black matrix 211 and the first alignment key 231 are formed on the transparent substrate 210 by patterning a metal layer or a black resin. Thereafter, the color filters 212a and 212b are formed on the transparent substrate 210 to cover the black matrix 211, and simultaneously, the second alignment key 232 is formed just on the first alignment key 231. In view of forming the color filters 212a and 212b, each of the color filters 212a and 212b has one of red (R), green (G) and blue (B) colors. Namely, the R, G and B color filters are alternately arranged on the transparent substrate 210. When forming the R, G and B color filters, a pigment dispersion method, dyeing process method or electrostatic painting method is used. Among these methods, the pigment dispersion method is much more satisfactory because the pigment dispersion method has very good accuracy and provides a superior color reproduction to the color filters. The second alignment key 232 is formed during the fabrication of one of the red, green and blue color filters.

Figure 5B:
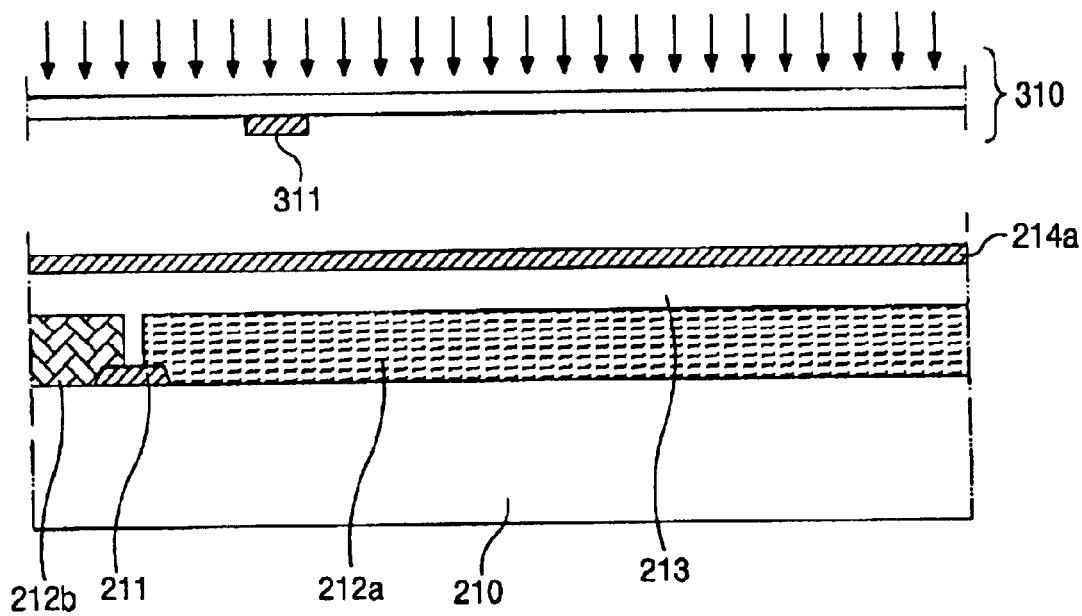
Figure 5C:
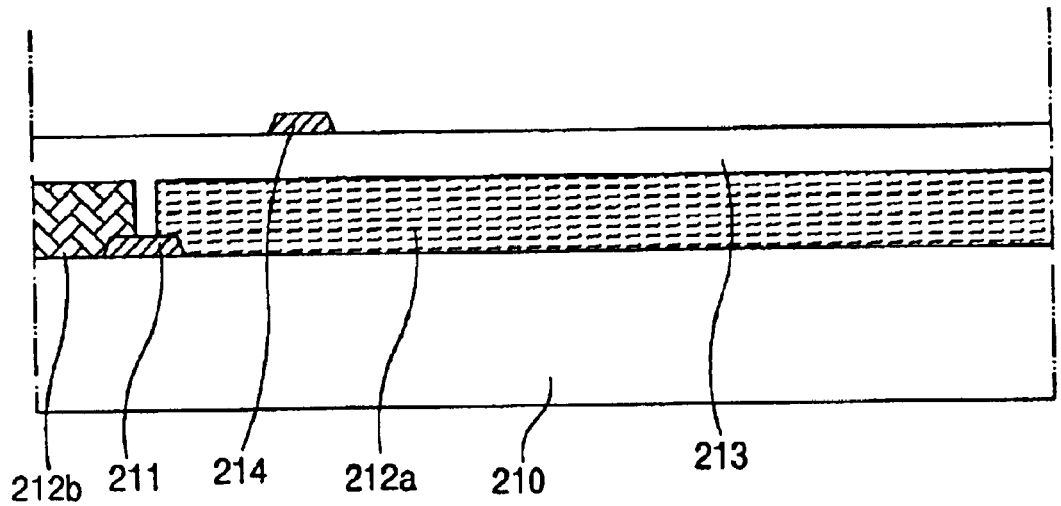
Figure 6B:
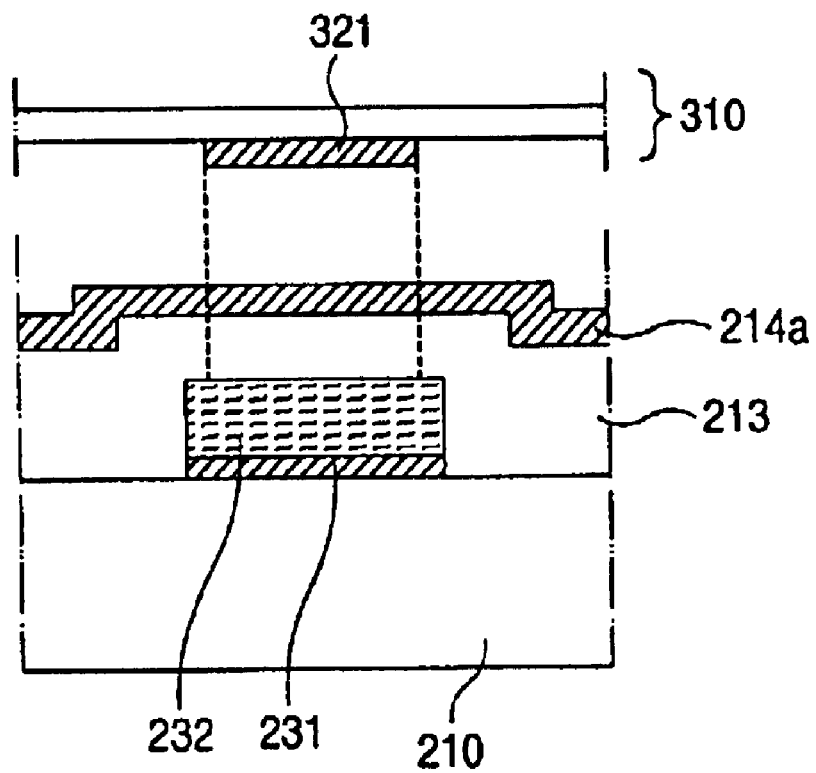

Now in FIGS. 5B and 6B, an overcoat layer 213 is formed to cover the color filters 212a and 212b and the first and second alignment keys 231 and 232. Thereafter, a metal layer 214a is deposited on the overcoat layer 213, and then a light exposure process is conducted using a mask 310 to form the gate electrode 214 of FIG. 5C. The mask 310 has a mask alignment key 321 and an electrode pattern 311, as shown in FIGS. 5B and 6B. During the light exposure process, the mask alignment key 321 of the mask 310 is matched with the first and second alignment keys 231 and 232 of the array substrate. As mentioned before, since the first and second alignment keys 231 and 232 are thick enough and have a large step, the alignment keys 231 and 232 are easily identified when aligning the mask 310 to the array substrate although the opaque metal layer 214a exists over the first and second alignment keys 231 and 232. When exposing the metal layer 214a light, the stepper method is mainly adopted. In the stepper method, the exposure is carried out with the mask 310 while the array substrate is being moved successively. Meanwhile, although not shown in FIGS. 5B and 6B, a photo-resist made of a photosensitive material is formed on the metal layer 214a.

Figure 6C:
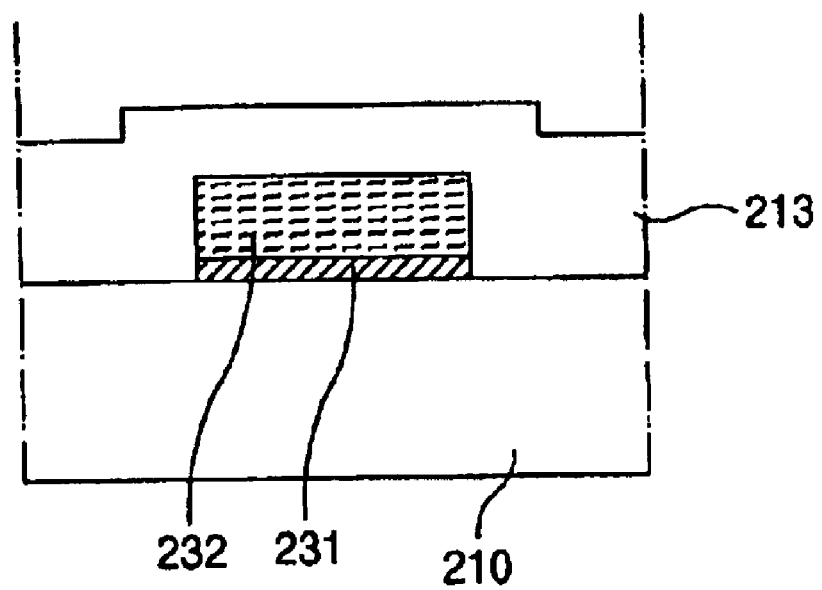

Referring to FIGS. 5C and 6C, the gate electrode 214 is formed by patterning the metal layer 214a of FIGS. 5B and 6B. The gate electrode 214 is located in a position corresponding to the electrode pattern 311 of the mask 310 (see FIG. 5B). Although not shown in FIGS. 5C and 6C, the gate line (see reference 111 of FIG. 2) is also formed with the gate electrode 214. The opaque metal layer 214a, the mask 310 and the mask alignment key 321 are removed in FIG. 6C.

Figure 5D:
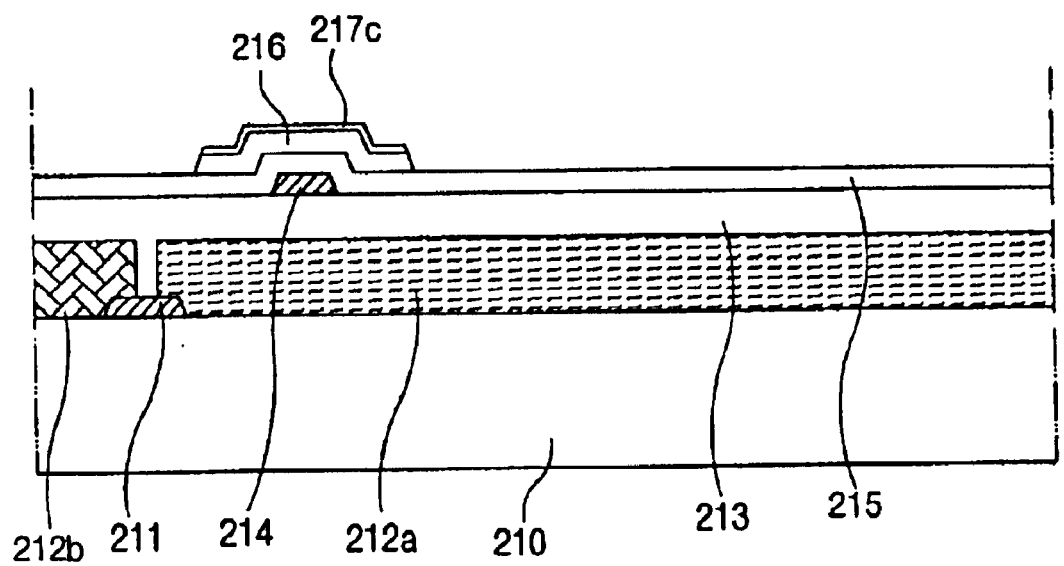
Figure 6D:
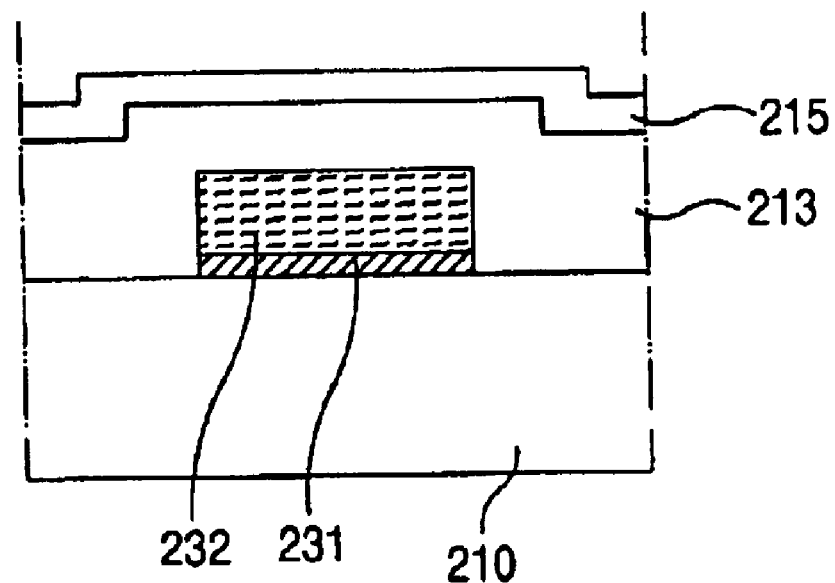

In FIGS. 5D and 6D, after forming the gate electrode 214, the gate insulation layer 215, an amorphous silicon layer (not shown) and a doped amorphous silicon layer (not shown) are sequentially formed on the overcoat layer 213 to cover the gate electrode 214. Thereafter, the amorphous silicon layer and the doped amorphous silicon layer are altogether patterned to form the active layer 216 and an extrinsic semiconductor layer 217c, respectively. The active layer 216 and the extrinsic semiconductor layer 217c are disposed over the gate electrode 214.

Figure 5E:
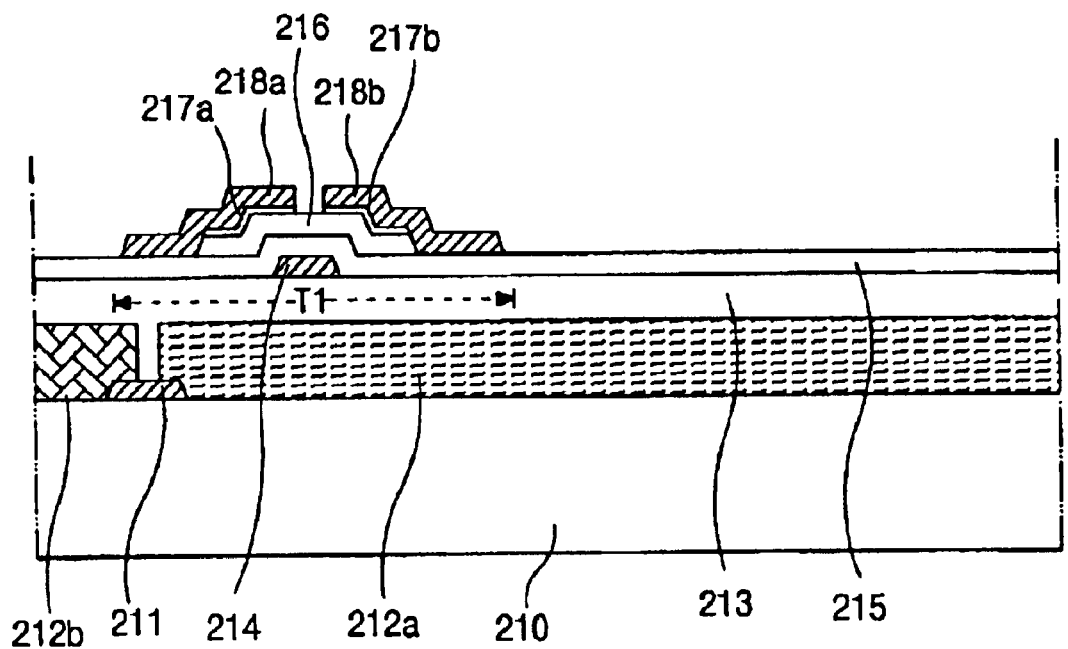
Figure 6E:
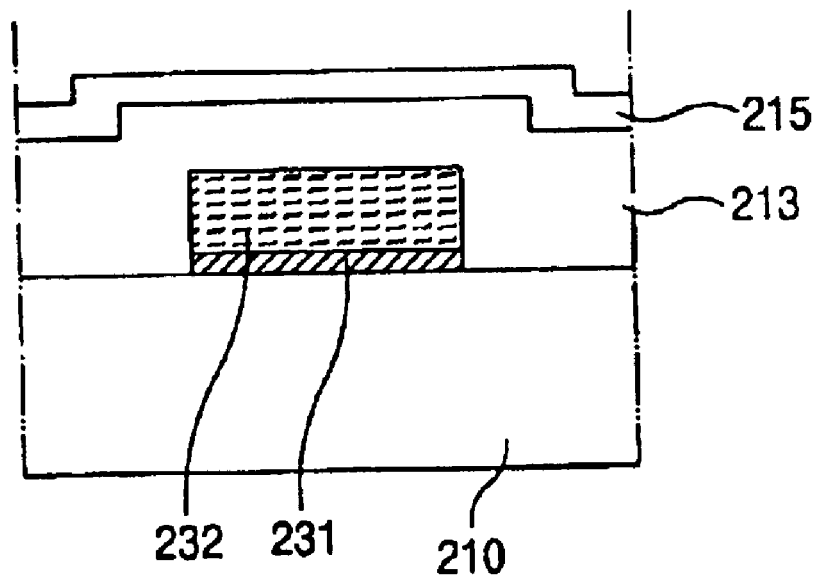

In FIGS. 5E and 6E, a metallic material is deposited on the gate insulation layer 215 to cover the active layer and the extrinsic semiconductor layer 217c using sputtering, and then patterned to form the source and drain electrodes 218a and 218b. Thereafter, a portion of the extrinsic semiconductor layer 217c between the source and drain electrodes 218a and 218b is etched out to form the ohmic contact layers 217a and 217b. Thus, the first ohmic contact layer 218a is interposed between the source electrode 218a and the active layer 216, and the second ohmic contact layer 218b is interposed between the drain electrode 218b and the active layer 216. When forming the source and drain electrodes 218a and 218b, a mask for the source and drain electrodes 218a and 218b is matched with the array substrate using the alignment keys 231 and 232 like the process of forming the gate electrode 214. At this time of forming the source and drain electrodes 218a and 218b, the data line (see reference 112 of FIG. 20 is also formed. The data line is connected to the source electrode and crosses the gate line to define the pixel region. Accordingly, the TFT T1 including the gate electrode 214, active layer 216, ohmic contact layers 217a and 217b and the source and drain electrodes 218a and 218b is completed.

Figure 5F:
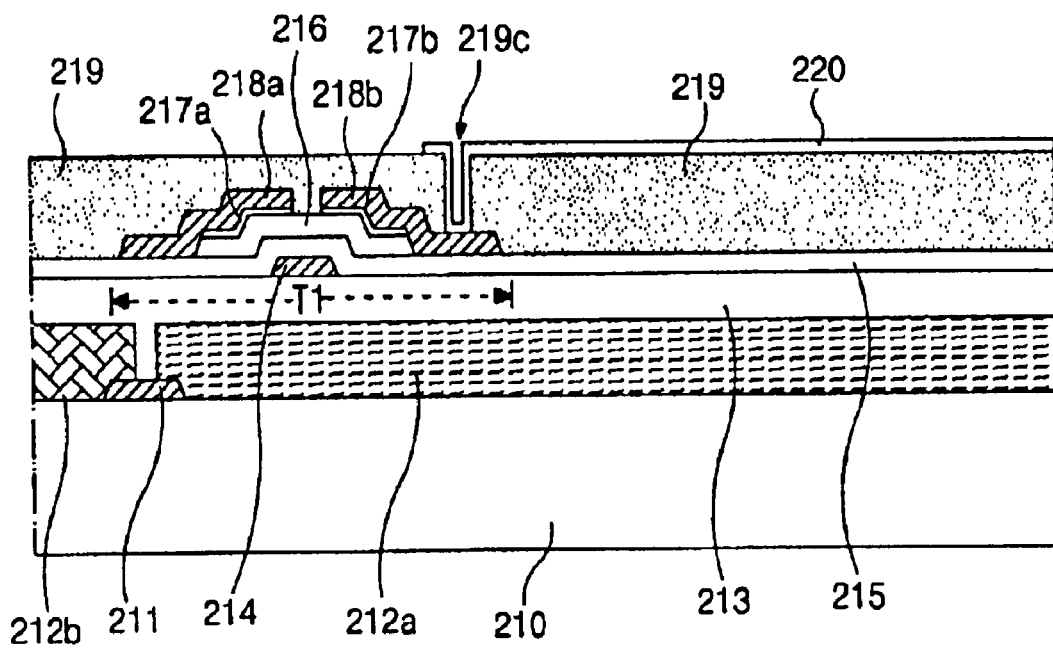
Figure 6F:
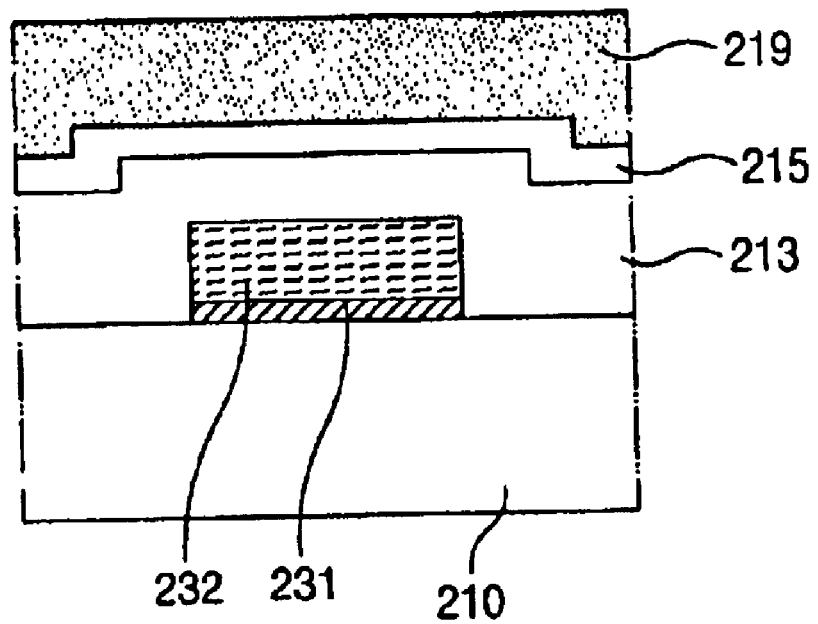

Next in FIGS. 5F and 6F, the passivation layer 219 is formed on the gate insulation layer to cover the TFT T1, and then patterned to form the drain contact hole 219c that exposes a portion of the drain electrode 218b. Thereafter, the transparent conductive material is deposited on the passivation layer 219, and then patterned to form the pixel electrode 220 on the passivation layer 219. The pixel electrode 220 contacts the drain electrode 218b through the drain contact hole 219c. At this point, the passivation layer 219 is made of an organic material that has a low dielectric constant. Here in the present invention, benzocyclobutene (BCB) or acryl-based resin is satisfactory. The transparent conductive material for the pixel electrode 220 is selected from a group consisting of indium-tin-oxide and indium-zinc-oxide.

In the first embodiment of the present invention having the TOC structure in the array substrate, the alignment keys are formed of the same material as the black matrix and color filters, so that they are thick enough to have a large step. Thus, when forming the gate electrode and the source and drain electrodes using the opaque metallic materials, the masks can be aligned accurately and misalignment does not occur.

In the meantime, since the gate, source and drain electrodes are made of the opaque materials, they can serve to prevent light leakage instead of the black matrix. Namely, the gate, source and drain electrodes act as a black matrix, so the black matrix 211 of FIG. 3 can be omitted. Simultaneously, the first alignment key 231 of FIG. 4 can also be removed.

Figure 7A:
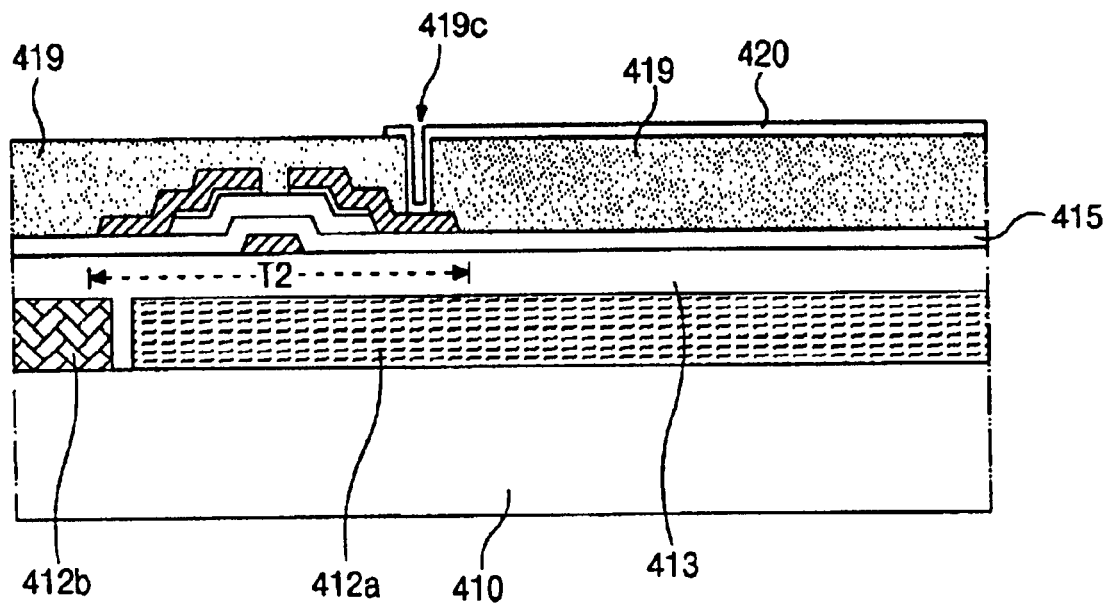
FIGS. 7A and 7B are cross-sectional views illustrating an array substrate according to a second embodiment of the present invention.
Figure 7B:
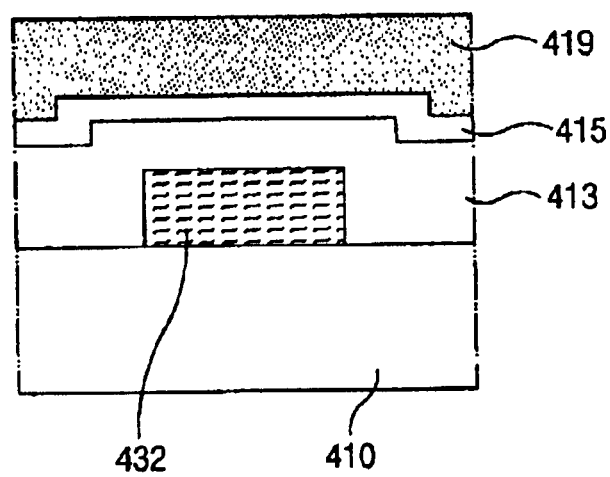

FIGS. 7A and 7B are cross-sectional views illustrating an array substrate according to a second embodiment of the present invention. FIG. 7A illustrates the pixel region of the array substrate, and FIG. 7B illustrates the alignment key region of the array substrate according to the second embodiment of the present invention.

Since the array substrate of the second embodiment shown in FIGS. 7A and 7B is very similar to that of the first embodiment shown in FIGS. 3 and 4, some detailed explanation is omitted with reference to FIGS. 7A and 7B. It is distinguishable in the second embodiment of the present invention that the black matrix is not formed on the transparent substrate.

In FIGS. 7A and 7B, color filters 412a and 412b and an alignment key 432 are formed on a transparent substrate 410 in the pixel region and in the alignment key region, respectively. An overcoat layer 413 covers the color filters 412a and 412b and the alignment key 432. In the pixel region shown in FIG. 7A, a thin film transistor (TFT) T2 is formed on the overcoat layer 413 and a passivation layer 419 is formed over the overcoat layer 413 to cover the TFT T2. Between the overcoat layer 413 and the passivation layer 419, a gate insulation layer 415 is interposed. The passivation layer 419 has a drain contact hole 419c such that a pixel electrode 420 formed on the passivation layer 419 in the pixel region contacts the TFT T2 through the drain contact hole 419c. In the alignment key region shown in 7B, the overcoat layer 413, the gate insulation layer 415 and the passivation layer 419 are sequentially formed on the alignment key 432.

Accordingly in the second embodiment, the black matrix is not formed in the pixel region, and the alignment key is single-layered in the alignment key region. Although the alignment key 432 is single-layered unlike the first embodiment, it can be thick enough to have a large step and be recognized easily during the fabrication process. Therefore, misalignment can be prevented in the process.

Meanwhile, the overcoat layer on the alignment key can be removed in order to increase the alignment key identification and discernment.

Figure 8A:
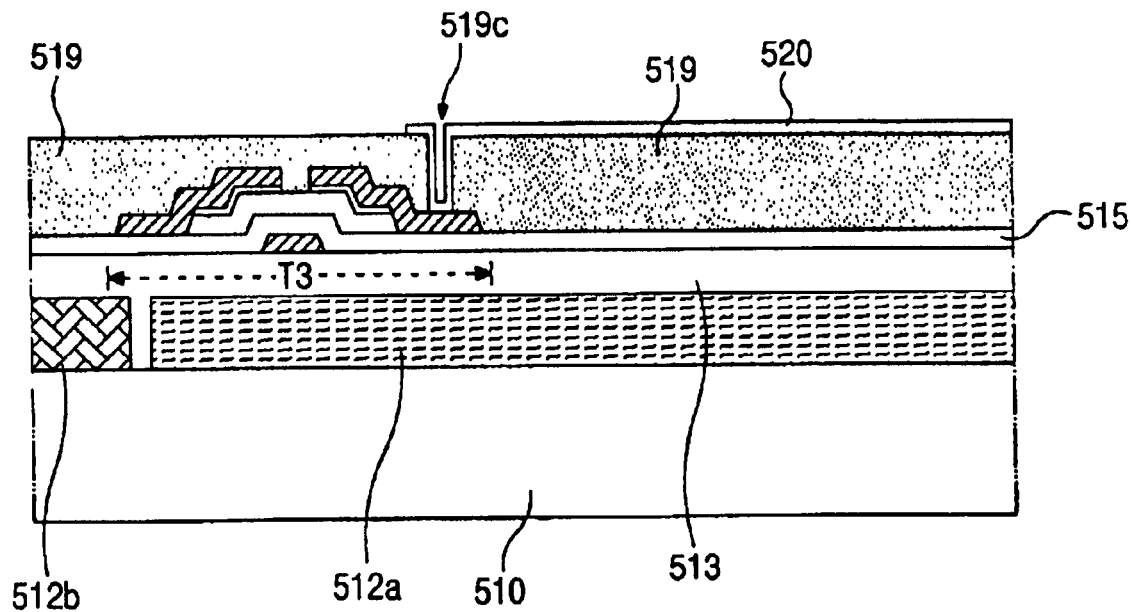
FIGS. 8A and 8B are cross-sectional views illustrating an array substrate according to a third embodiment of the present invention.
Figure 8B:
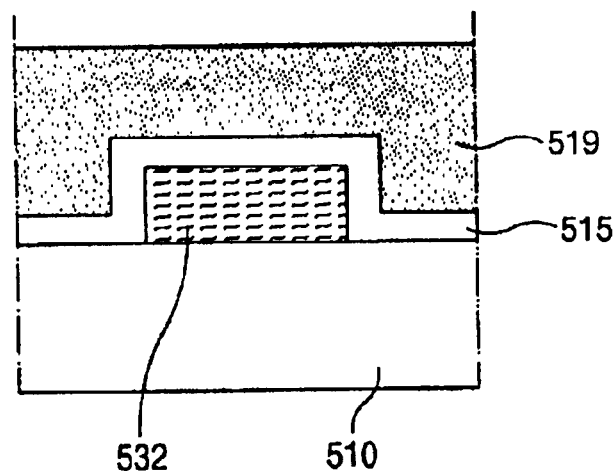

FIGS. 8A and 8B are cross-sectional views illustrating an array substrate according to a third embodiment of the present invention. FIG. 8A illustrates the pixel region of the array substrate, and FIG. 8B illustrates the alignment key region of the array substrate according to the third embodiment of the present invention.

In FIGS. 8A and 8B, color filters 512a and 512b and an alignment key 532 are formed on a transparent substrate 510 in the pixel region and in the alignment key region, respectively. An overcoat layer 513 covers only the color filters 512a and 512b unlike the second embodiment.

In the pixel region shown in FIG. 8A, a thin film transistor (TFT) T3 is formed on the overcoat layer 513 and a passivation layer 519 is then formed over the overcoat layer 513 to cover the TFT T3. Between the overcoat layer 513 and the passivation layer 519 in the pixel region, a gate insulation layer 515 is interposed. The passivation layer 519 has a drain contact hole 519c such that a pixel electrode 520 formed on the passivation layer 519 in the pixel region contacts the TFT T3 through the drain contact hole 519c.

In the alignment key region shown in 8B, the alignment key 532 is formed on the transparent substrate 510 and the gate insulation layer 515 covers the alignment key 532. The passivation layer 519 is formed on the gate insulation layer 515.

In the third embodiment of the present invention, a portion of the overcoat layer 513 is removed in the alignment key region. Thus, the alignment key in the third embodiment can be more easily recognized rather than in the first and second embodiments.

In the first to third embodiments, the gate electrode is formed just on the overcoat layer using the metallic material. However, when forming the metallic material on the overcoat layer, the overcoat layer can be damaged. Thus, a buffer layer is required between the overcoat layer and the metal layer.

In the fourth to sixth embodiments of the present invention illustrated hereinafter, the buffer layer is inserted between the overcoat layer and the gate electrode.

Figure 9A:
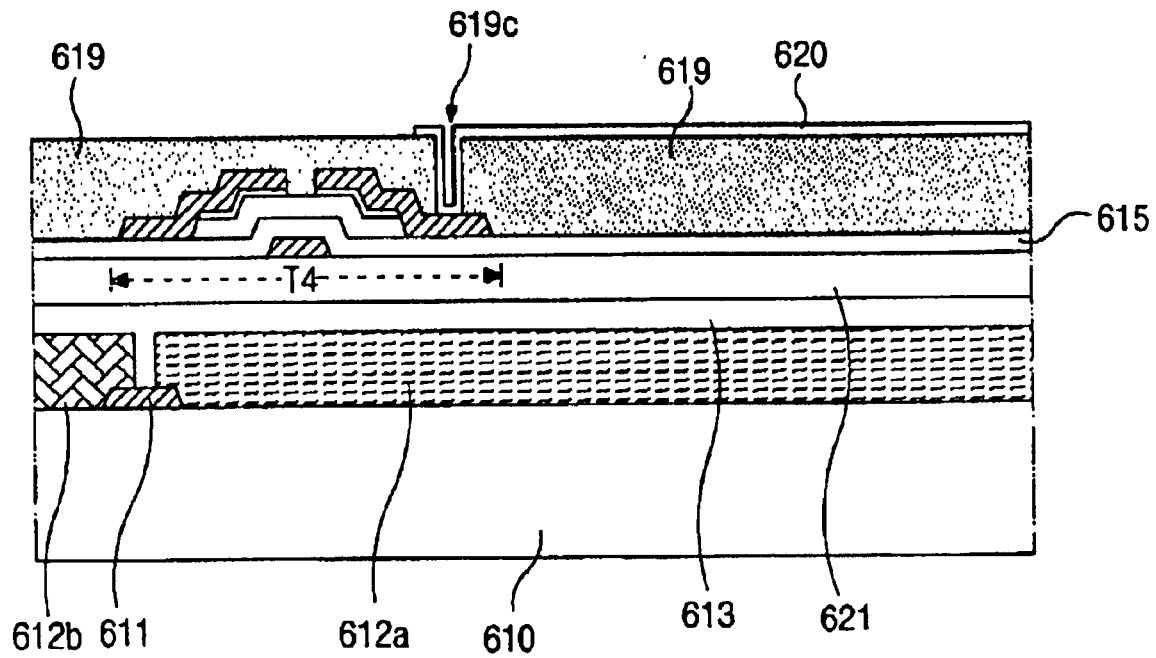
FIGS. 9A and 9B are cross-sectional views illustrating an array substrate according to a fourth embodiment of the present invention.
Figure 9B:
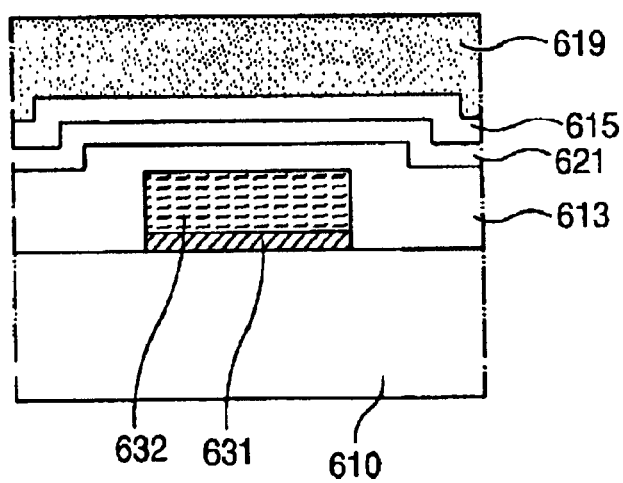

FIGS. 9A and 9B are cross-sectional views illustrating an array substrate according to a fourth embodiment of the present invention. FIG. 9A illustrates the pixel region of the array substrate, and FIG. 9B illustrates the alignment key region of the array substrate according to the fourth embodiment of the present invention.

In FIGS. 9A and 9B, a black matrix 611 and a first alignment key 631 are formed on a transparent substrate 610 in the pixel region and in the alignment key region, respectively. Color filters 612a and 612b are formed on the transparent substrate 610 to cover a portion of the black matrix 611 in the pixel region. A second alignment key 632 is formed on the first alignment key 631 in the alignment key region. The first alignment key 631 is the same material as the black matrix, while the second alignment key 632 is the same material as the color filters 612a and 612b. An overcoat layer 613 covers the color filters 612a and 612b and the first and second alignment keys 631 and 632. On the overcoat layer 613, a buffer layer 621 is formed to protect from deteriorating the overcoat layer 613 in the process of forming a gate electrode.

In the pixel region shown in FIG. 9A, a thin film transistor (TFT) T4 is formed on the buffer layer 621 and a passivation layer 619 is then formed over the buffer layer 621 to cover the TFT T4. Between the buffer layer 621 and the passivation layer 619 in the pixel region, a gate insulation layer 615 is interposed. The passivation layer 619 has a drain contact hole 619c such that a pixel electrode 620 formed on the passivation layer 619 in the pixel region contacts the TFT T4 through the drain contact hole 619c.

In the alignment key region shown in FIG. 9B, the first and second alignment keys 631 and 632 are formed on the transparent substrate 610. The overcoat layer 613 covers the first and second alignment keys 631 and 632, and then the buffer layer 621, the gate insulation layer 615, the passivation layer 619 are sequentially formed on the buffer layer 613.

Figure 10A:
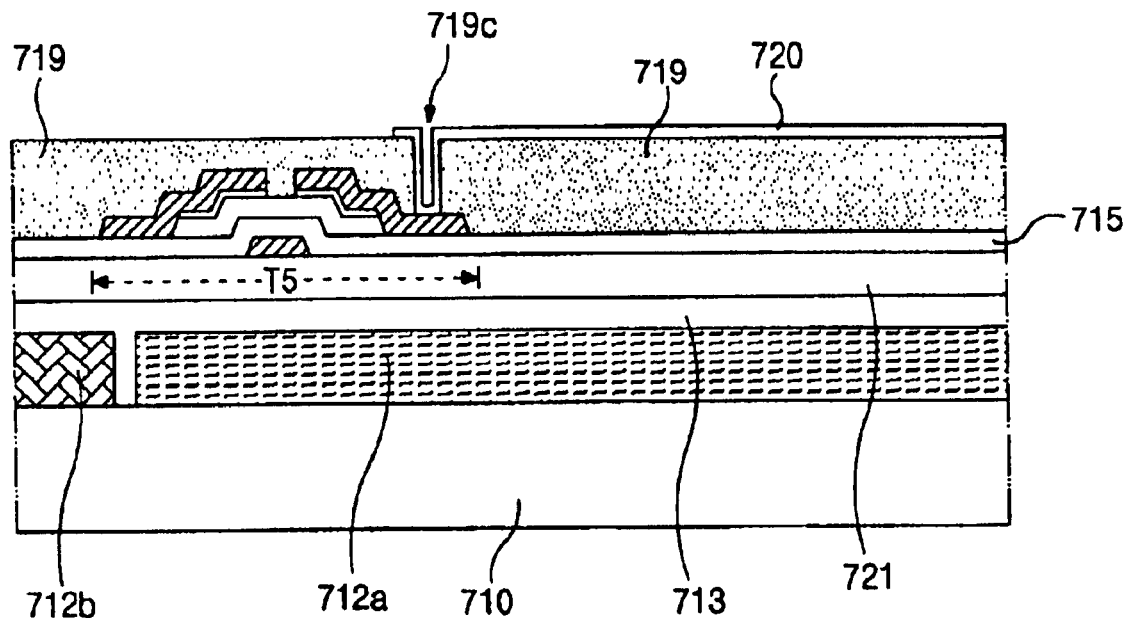
FIGS. 10A and 10B are cross-sectional views illustrating an array substrate according to a fifth embodiment of the present invention.
Figure 10B:
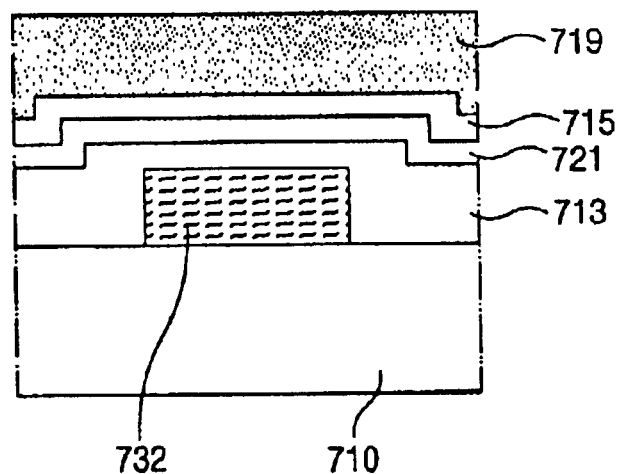

FIGS. 10A and 10B are cross-sectional views illustrating an array substrate according to a fifth embodiment of the present invention. FIG. 10A illustrates the pixel region of the array substrate, and FIG. 10B illustrates the alignment key region of the array substrate according to the fifth embodiment of the present invention.

In FIGS. 10A and 10B, color filters 712a and 712b and an alignment key 732 are formed on a transparent substrate 710 in the pixel region and in the alignment key region, respectively. An overcoat layer 713 covers all of the color filters 712a and 712b and the alignment key 732. A buffer layer 721 is formed on the overcoat layer 713.

In the pixel region shown in FIG. 10A, a thin film transistor (TFT) T5 is formed on the buffer layer 721, and a passivation layer 719 is then formed over the buffer layer 713 to cover the TFT T5. Between the buffer layer 721 and the passivation layer 719 in the pixel region, a gate insulation layer 715 is interposed. The passivation layer 719 has a drain contact hole 719c such that a pixel electrode 720 formed on the passivation layer 719 in the pixel region contacts the TFT T5 through the drain contact hole 719c.

In the alignment key region shown in 10B, the single-layered alignment key 732 is formed on the transparent substrate 710, and then the overcoat layer 713 covers the alignment key 732. The buffer layer 721, the gate insulation layer 715 and the passivation layer 719 are sequentially formed on the overcoat layer 713. The black matrix is not formed in the pixel region.

Figure 11A:
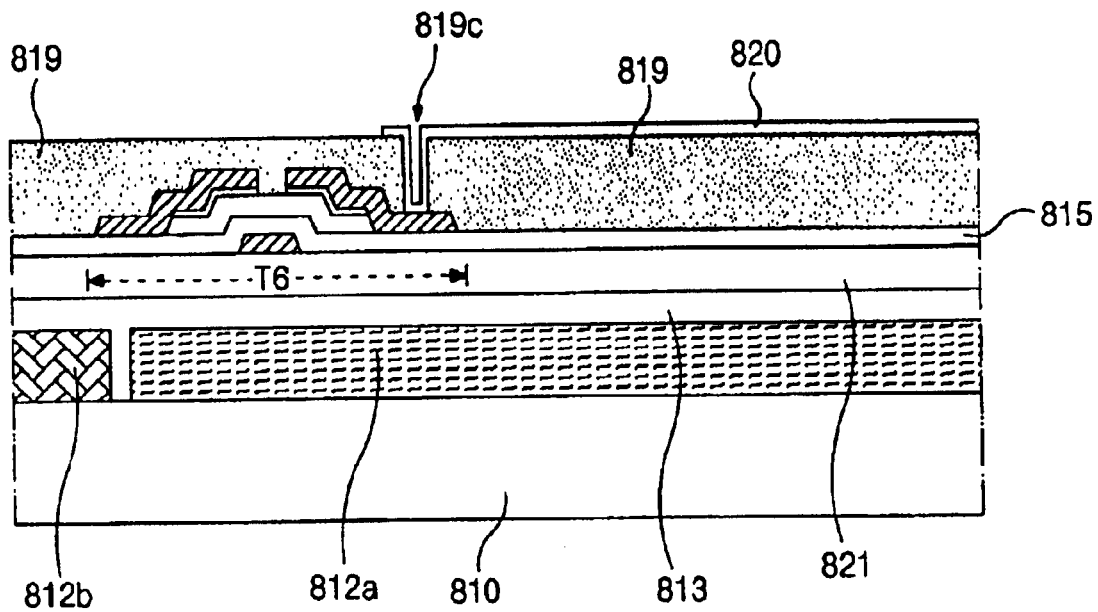
FIGS. 11A and 11B are cross-sectional views illustrating an array substrate according to a sixth embodiment of the present invention.
Figure 11B:
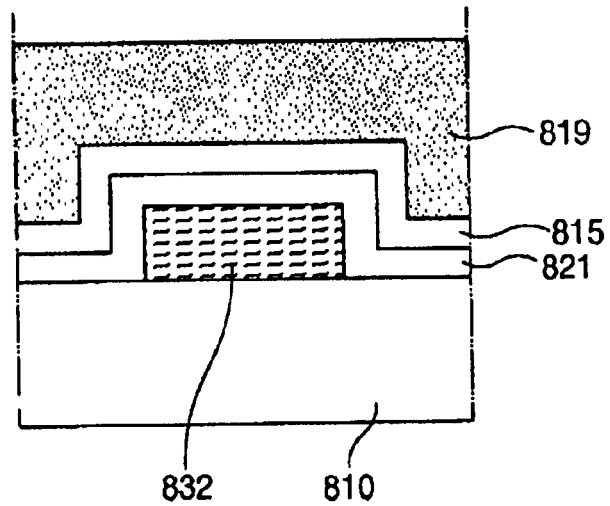

FIGS. 11A and 11B are cross-sectional views illustrating an array substrate according to a sixth embodiment of the present invention. FIG. 11A illustrates the pixel region of the array substrate, and FIG. 11B illustrates the alignment key region of the array substrate according to the sixth embodiment of the present invention.

In FIGS. 11A and 11B, color filters 812a and 812b and single layered alignment key 832 are formed on a transparent substrate 810 in the pixel region and in the alignment key region, respectively. An overcoat layer 813 covers only the color filters 812a and 812b unlike the fifth embodiment. A portion of the overcoat layer 813 is removed in the alignment key region. The black matrix is not formed in the pixel region.

In the pixel region shown in FIG. 11A, a buffer layer 821 is formed on the overcoat layer 813 that covers the color filters 812a and 812b. A thin film transistor (TFT) T6 is formed on the buffer layer 821, and a passivation layer 819 is then formed over the buffer layer 821 to cover the TFT T5. Between the buffer layer 821 and the passivation layer 819 in the pixel region, a gate insulation layer 815 is interposed. The passivation layer 819 has a drain contact hole 819c such that a pixel electrode 820 formed on the passivation layer 819 in the pixel region contacts the TFT T6 through the drain contact hole 819c.

In the alignment key region shown in 11B, the alignment key 832 is formed on the transparent substrate 810, and then the buffer layer 821 covers the alignment key 832. The gate insulation layer 815 and the passivation layer 819 are sequentially formed on the buffer layer 821.

In the above-mentioned fourth to sixth embodiments of the present invention, the alignment key is made of only the color filter material or both the color filter material and the black matrix material. Further, the buffer layer is formed on the overcoat layer overcoat layer such that damage of the overcoat layer is prevented when forming the gate electrode of the TFT.

In the present invention, since the color filters are formed under the TFT in the array substrate, the aperture ratio of the liquid crystal display increases. The alignment keys arranged in peripheral portions of the liquid crystal display panel has large steps, so that misalignment does not occur when forming and patterning the opaque layers. Also, since the alignment keys are formed of only the color filter material or both the black matrix material and the color filter material, the additional process for forming the alignment keys is not required.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for use in a liquid crystal display device, comprising:
   a transparent substrate that includes a display area and a non-display area;
   a plurality of red, green and blue color filters that are formed on the transparent substrate in the display area;
   a first alignment key formed on the transparent substrate in the non-display area and made of the same material as said color filters;
   an overcoat layer formed on the plurality of red, green and blue color filters to cover said color filters in the display area;
   gate and data lines formed over the overcoat layer, the gate and data lines crossing each other to define a pixel region in the display area;
   a thin film transistor formed over the overcoat layer in the display area, the thin film transistor arranged in the pixel region and connected to the gate and data lines;
   a passivation layer covering the gate and data lines and the thin film transistor in the display area and covering the first alignment key in the non-display area, the passivation layer having a drain contact hole to the thin film transistor;
   a gate insulation layer interposed between the overcoat layer and the passivation layer in the display area and between the substrate and the passivation layer in the non-display area; and
   a pixel electrode formed on the passivation layer in the display area, the pixel electrode contacting the thin film transistor through the drain contact hole.

2. The array substrate according to claim 1, wherein the gate insulation layer covers the first alignment key in the non-display area.

3. The array substrate according to claim 1, further comprising a buffer layer between the overcoat layer and the thin film transistor in the display area.

4. The array substrate according to claim 3, wherein the buffer layer is interposed between the first alignment key and the passivation layer in the non-display area.

5. The array substrate according to claim 4, wherein the buffer layer covers the first alignment key in the non-display area.

6. The array substrate according to claim 1, further comprising a black matrix on the transparent substrate in boundaries of the plurality of red, green and blue color filters, wherein the black matrix is arranged between the transparent substrate and the color filters.

7. The array substrate according to claim 6, further comprising a second alignment key between the transparent substrate and the first alignment key, wherein the second alignment key is made of the same material as the black matrix.

8. The array substrate according to claim 7, wherein the overcoat layer covers the first and second alignment keys in the non-display area.

9. The array substrate according to claim 8, further comprising a buffer layer on the overcoat layer, between the overcoat layer and the thin film transistor in the display area and between the overcoat layer and the gate insulation layer in the non-display area.

10. The array substrate according to claim 1, wherein the overcoat layer covers the first alignment key in the non-display area.

11. The array substrate according to claim 10, further comprising a buffer layer on the overcoat layer, between the overcoat layer and the thin film transistor in the display area and between the overcoat layer and the gate insulation layer in the non-display area.

12. A method of forming an array substrate for use in a liquid crystal display device, comprising:
   providing a transparent substrate that includes a display area and a non-display area;
   forming a plurality of red, green and blue color filters on the transparent substrate in the display area;
   forming a first alignment key on the transparent substrate in the non-display area using the same material as said color filters;
   forming an overcoat layer on the plurality of red, green and blue color filters to cover said color filters in the display area;
   forming gate and data lines over the overcoat layer, the gate and data lines crossing each other to define a pixel region in the display area;

forming a thin film transistor over the overcoat layer in the display area, the thin film transistor arranged in the pixel region and connected to the gate and data lines;

forming a passivation layer to cover the gate and data lines and the thin film transistor in the display area and to cover the first alignment key in the non-display area, the passivation layer having a drain contact hole to the thin film transistor;

forming a gate insulation layer between the overcoat layer and the passivation layer in the display area and between the substrate and the passivation layer in the non-display area; and forming a pixel electrode on the passivation layer in the display area, the pixel electrode contacting the thin film transistor through the drain contact hole.

13. The method according to claim 12, wherein the gate insulation layer covers the first alignment key in the non-display area.

14. The method according to claim 12, further comprising forming a buffer layer between the overcoat layer and the thin film transistor in the display area.

15. The method according to claim 14, wherein the buffer layer is interposed between the first alignment key and the passivation layer in the non-display area.

16. The method according to claim 15, wherein the buffer layer covers the first alignment key in the non-display area.

17. The method according to claim 12, further comprising forming a black matrix on the transparent substrate in boundaries of the plurality of red, green and blue color filters, wherein the black matrix is arranged between the transparent substrate and the color filters.

18. The method according to claim 17, further comprising forming a second alignment key between the transparent substrate and the first alignment key, wherein the second alignment key is made of the same material as the black matrix.

19. The method according to claim 18, wherein the overcoat layer covers the first and second alignment keys in the non-display area.

20. The method according to claim 19, further comprising forming a buffer layer on the overcoat layer, between the overcoat layer and the thin film transistor in the display area and between the overcoat layer and the gate insulation layer in the non-display area.

21. The method according to claim 12, wherein the overcoat layer covers the first alignment key in the non-display area.

22. The method according to claim 21, further comprising forming a buffer layer on the overcoat layer, between the overcoat layer and the thin film transistor in the display area and between the overcoat layer and the gate insulation layer in the non-display area.

* * * * *